3,056,658
PROCESS FOR PRODUCING MOLYBDENUM
DISILICIDE
Joseph H. Brennan and Stephen W. Scott, Niagara Falls,
N.Y., assignors to Union Carbide Corporation, a corporation of New York
No Drawing. Filed Sept. 1, 1960, Ser. No. 53,337
3 Claims. (Cl. 23—204)

This invention relates to a process for the production of highly pure molybdenum disilicide.

The compound molybdenum disilicide has several uses each requiring a different grade or purity. When the compound is used as an addition agent to add molybdenum to ferrous melts, the molybdenum disilicide may contain iron impurities. However, when the molybdenum disilicide is to be used in electrical resistors, coatings, heating elements, or refractory articles, a much higher purity product is required and often it must be iron free.

The preferred present-day method of producing molybdenum disilicide involves heating in a vacuum or inert atmosphere stoichiometric mixtures of comminuted elemental molybdenum and comminuted elemental silicon to form the disilicide of molybdenum. The charge is placed in alumina or magnesia crucibles to avoid contamination and heated in an electric furnace for about 8 hours at temperatures around 1400° C. This reaction is thus seen to be extended, requires large amounts of electrical energy for heating and requires expensive refractories.

It had earlier been proposed to form compounds from ores of metals by reducing the oxidic ores with aluminum or silicon. Such processes have not always been satisfactory and the application of these thermic reducing reactions to the production of molybdenum disilicide has not produced the high purity product desired.

For example, in one prior art process for the production of molybdenum-silicon compounds, a mixture of molybdenum oxide, ferrosilicon, aluminum and a fluxing agent are reacted to yield a product containing the molybdenum-silicon compound. This product actually analyzes as a complex ferromolybdenum-silicon alloy and not molybdenum disilicide and is unsuited for many of the uses mentioned above. Furthermore, the product contains objectional amounts of iron and free silicon.

The prior art variously teaches using an excess of silicon, or an excess of aluminum, or both in the belief that the excess will reside in the slag leaving a pure molybdenum-silicon compound; but the products of these processes are invariably complex silicon-molybdenum alloys, containing more than one silicide of molybdenum and being of low purity.

It is the primary object of this invention, therefore, to provide a process for the production of high purity molybdenum disilicide.

It is a further object of this invention to provide a process for the production of high purity molybdenum disilicide which is substantially free of iron impurities and free silicon.

It is also an object of this invention to provide a process for the production of high purity molybdenum disilicide which does not require vacuum or electrical heating apparatus and which can be carried out with inexpensive refractories.

Other aims and advantages of the invention will be apparent from the following description and the appended claims.

In accordance with these objects a method is provided for the production of high purity molybdenum disilicide comprising preparing a mixture consisting essentially of a particulated oxidic compound of molybdenum, particulated aluminum in an amount sufficient to reduce from about one third to all of said molybdenum oxide, and particulated silicon metal in an amount sufficient to reduce the remainder of the molybdenum oxide and to react with the reduced molybdenum to form molybdenum disilicide, heating the mixture to an ignition temperature, whereupon said mixture is ignited and is self-propagating to produce high purity molybdenum disilicide.

The term particulated means in such a divided state as to react with the other materials in the charge when ignited. For example, the particulated molybdenum oxide may be crushed material, while the particulated aluminum may be aluminum shot, and the particulated silicon metal may be crushed silicon metal.

It has been found that while varying percentages of aluminum and silicon could theoretically be used to reduce the oxide, that a high purity product containing little residual silicon or aluminum can be produced when the indicated proportions are used. In a preferred form of the invention, aluminum is present in the charge in an amount sufficient to reduce one half of the molybdenum oxide and the silicon is present in the charge in an amount sufficient to reduce the other half of the molybdenum oxide plus enough silicon to form molybdenum disilicide from the reduced molybdenum.

It has been found that whereas prior art methods use excesses of ingredients in unrelated proportions in similar reducing reactions, that use of the proportions indicated above gives a product substantially free of impurities and homogeneous in composition. The molybdenum disilicide produced according to this invention may be shown by X-ray diffraction methods to be substantially free of silicides other than molybdenum disilicide.

Molybdenum oxides which may be used are $MoO_3$, $Mo_2O_3$, $MoO_2$, and $Mo_2O_5$. A preferred oxide is the trioxide. When molybdenum trioxide is used and aluminum is used in an amount sufficient to reduce about one third of the oxidic, the following reaction takes place:

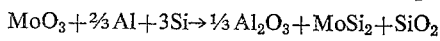
$$MoO_3 + 2/3 Al + 3Si \rightarrow 1/3 Al_2O_3 + MoSi_2 + SiO_2$$

When the aluminum is present in an amount sufficient to reduce all the oxide, the following reaction takes place:

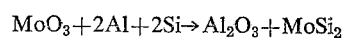
$$MoO_3 + 2Al + 2Si \rightarrow Al_2O_3 + MoSi_2$$

It can be seen from the above equations that, when molybdenum trioxide is the oxide to be reduced and reacted to form molybdenum disilicide, that from about .7 percent to about 21 percent by weight of the reactants should be aluminum, and that from about 34 percent to about 22 percent by weight of the reactants should be silicon, with the balance molybdenum trioxide. In the preferred form of the invention where aluminum is used to reduce about one half of the oxide, the amount of aluminum in the reactants will be about 11 percent, with about 32 percent silicon and 57 percent molybdenum trioxide. It is to be noted that these proportions will be different when other oxides of molybdenum are used.

In the practice of the invention, the molybdenum trioxide should be agglomerated before use because its light fluffy nature would cause losses as dust. The silicon metal used should be of the same order of purity required of the end product. A typical purified silicon metal contains about 99.7 percent silicon, 0.015 percent iron and 0.2 percent calcium and aluminum. A furnace-grade silicon metal may contain about 0.66 percent iron impurities, as well as 0.30 percent calcium and aluminum; but an acid leaching of the furnace-grade metal will convert it to purified silicon. Actually, an acceptable product can often be made using unleached furnace-grade metal.

The aluminum metal may be high-purity aluminum shot or granules.

The charge is prepared by mixing the indicated proportions of the materials and is placed in a silica sand-lined tapping pot. There is no need for the use of the expensive refractory linings required in other processes for the production of molybdenum disilicide. To aid in bringing the charge to an ignition temperature, a pocket may be formed in the charge and filled with magnesium metal powder or sodium nitrate, etc. Additional magnesium metal powder is scattered over the surface of the charge. The charge can be ignited by means of an electrically heated hot wire embedded in the magnesium metal. Upon ignition, the reaction propagates itself and within about two minutes a fluid slag and metal product are formed. After cooling, the slag and metal are removed. The slag is free of metal and the molybdenum disilicide product possess an excellent metallic appearance and high purity. The molybdenum disilicide product contains little free silicon, iron or aluminum and is useful in all applications requiring a high purity product.

Several examples of the operation of the invention follow:

Example I

A quantity of molybdenum trioxide was agglomerated by mixing with 22 pounds of water and 14 ounces of sodium silicate. The agglomerated molybdenum trioxide was then pelletized in a pillow block press and then dried in an oven at 300° F. overnight. The dried pellets were then crushed to a 20 mesh and down size.

The molybdenum trioxide was mixed with comminuted purified silicon metal and aluminum shot or granules. The total weights of materials were as follows:

| | Pounds |
|---|---|
| Crushed $MoO_3$ | 150.0 |
| Purified silicon metal | 83.0 |
| Aluminum metal | 28.05 |

The charge was actually prepared in five equal batches each containing 30 pounds of $MoO_3$, 16.60 pounds of silicon metal, and 5.61 pounds of aluminum shot, with the exception of the fifth batch which contained 5.61 pounds of aluminum granules instead of shot.

The charge was placed in a silica sand-lined, 15 cubic foot, conical tapping pot in layers and tamped. The fifth batch containing the aluminum granules was placed over the top layer and tamped.

Magnesium metal was placed in a pocket in the charge and additional magnesium metal scattered over the top of the charge. The charge was ignited by means of an electrically heated wire embedded in the magnesium metal. The mix reacted and, within 2 minutes, yielded a fluid slag and metal product. After cooling the reaction products were removed. The slag was clean, dense, and free from metal shot. The metal had an excellent metallic appearance and had the following chemical analysis:

| | Percent |
|---|---|
| Molybdenum | 63.95 |
| Silicon | 35.09 |
| Aluminum | 0.15 |
| Iron | 0.15 |
| Carbon | 0.01 |
| Oxygen | 0.05 |
| Nitrogen | 0.009 |

This corresponds closely to the theoretical composition of molybdenum disilicide, 63.2 percent molybdenum and 36.8 percent silicon.

Example II

The procedure of Example I was followed except that furnace-grade metal rather than purified silicon metal was used.

The molybdenum disilicide produced had the following composition:

| | Percent |
|---|---|
| Molybdenum | 63.97 |
| Silicon | 34.60 |
| Aluminum | 0.35 |
| Iron | 0.42 |
| Carbon | 0.01 |
| Oxygen | 0.10 |
| Nitrogen | 0.19 |

The molybdenum disilicide product thus had a low iron content and was made up almost entirely of molybdenum disilicide.

Thus it is seen that the invention provides a simple, economical method for producing high purity molybdenum disilicide. The process uses inexpensive materials, is self-propagating and does not require the expenditure of large amounts of electrical energy. Nor is it necessary to conduct the reaction in a vacuum or inert atmosphere. The invention therefore constitutes a valuable contribution to the art.

What is claimed is:

1. A method for the production of high purity molybdenum disilicide comprising preparing a mixture consisting essentially of a particulated oxidic compound of molybdenum, particulated aluminum in an amount sufficient to reduce from about one third to all of the molybdenum oxide, and particulated silicon metal in an amount sufficient to reduce the remainder of the molybdenum oxide and to react with the reduced molybdenum to form molybdenum disilicide, heating the mixture to an ignition temperature, whereupon the mixture is ignited and is self-propagating to produce high purity molybdenum disilicide and a slag, and separating the molybdenum disilicide from the slag.

2. A method for the production of high purity molybdenum disilicide comprising preparing a mixture consisting essentially of from about 7 percent to about 21 percent by weight particulated aluminum, from about 34 percent to about 22 percent by weight particulated silicon metal, and the balance particulated molybdenum trioxide, heating the mixture to an ignition temperature, whereupon the mixture is ignited and is self-propagating to produce high purity molybdenum disilicide and a slag, and separating the molybdenum disilicide from the slag.

3. A method for the production of high purity molybdenum disilicide comprising preparing a mixture consisting essentially of about 11 percent by weight particulated aluminum, about 32 percent by weight particulated silicon metal, and the balance substantially all particulated molybdenum trioxide, heating the mixture to an ignition temperature, whereupon the mixture is ignited and is self-propagating to produce high purity molybdenum disilicide and a slag, and separating the molybdenum disilicide from the slag.

References Cited in the file of this patent

UNITED STATES PATENTS 2,619,406    Briney _____ Nov. 25, 1952

OTHER REFERENCES

Mellor's, "A Comprehensive Treatise on Inorganic and Theoretical Chemistry," vol. 6, 1925 ed., page 192, The Longmans, Green and Co., N.Y.